(12) United States Patent
Nishiyama (10) Patent No.: US 9,232,107 B2
(45) Date of Patent: Jan. 5, 2016

(54) IMAGE PROCESSING APPARATUS THAT PREVENTS ERRONEOUS TRANSMISSION, METHOD OF CONTROLLING THE SAME, AND STORAGE MEDIUM

(75) Inventor: Masashi Nishiyama, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 181 days.

(21) Appl. No.: 13/315,635

(22) Filed: Dec. 9, 2011

(65) Prior Publication Data

US 2012/0147436 A1 Jun. 14, 2012

(30) Foreign Application Priority Data

Dec. 14, 2010 (JP) .................................. 2010-278300

(51) Int. Cl.
*G06F 3/12* (2006.01)
*H04N 1/40* (2006.01)
*H04N 1/00* (2006.01)
*H04N 1/32* (2006.01)

(52) U.S. Cl.
CPC .... *H04N 1/32096* (2013.01); *H04N 2201/0094* (2013.01)

(58) Field of Classification Search
USPC .................. 358/1.15, 400, 405, 404, 440, 444
See application file for complete search history.

(56) References Cited

U.S. PATENT DOCUMENTS

| 5,838,459 | A  | * | 11/1998 | Hashimoto .................... | 358/402 |
| 6,339,685 | B1 | * | 1/2002 | Okamoto ................ | B65H 7/00 270/58.01 |
| 7,068,165 | B2 | * | 6/2006 | Takahashi et al. ........ | 340/539.26 |
| 7,187,478 | B2 | * | 3/2007 | Mikame et al. ............... | 358/468 |
| 8,081,332 | B2 | * | 12/2011 | Nagarajan et al. ........... | 358/1.15 |
| 8,379,257 | B2 | * | 2/2013 | Uchida ........................ | 358/1.15 |
| 8,411,291 | B2 | * | 4/2013 | Kadota ........................ | 358/1.13 |
| 2005/0165848 | A1 | * | 7/2005 | Kusama ............. | G06F 17/3028 1/1 |
| 2006/0017965 | A1 | * | 1/2006 | Tonegawa .................... | 358/1.15 |
| 2006/0037061 | A1 | * | 2/2006 | Ishihara et al. ............... | 725/135 |

(Continued)

FOREIGN PATENT DOCUMENTS

JP 02076443 A 3/1990
JP 09275476 A 10/1997

(Continued)

OTHER PUBLICATIONS

Official Action issued in JP2010-278300 mailed Nov. 11, 2014.

*Primary Examiner* — Madelein Nguyen
(74) *Attorney, Agent, or Firm* — Rossi, Kimms & McDowell LLP (57) ABSTRACT

An image processing apparatus capable of preventing erroneous transmission due to a change in destination information in a shared address book. A CPU acquires destination information including at least an identifier and a destination, and a destination of the image data is designated from the acquired destination information. Information on the designated destination of the image data is stored in a destination usage history table. The CPU determines whether or not the acquired destination information has been changed by comparing the designated destination information and the destination information stored in the destination usage history table. If it is determined that the destination information has been changed, a screen for confirming the destination information is displayed. The destination information is designated from the acquired destination information according to a user's confirming operation on the displayed screen.

11 Claims, 6 Drawing Sheets

(56) References Cited

U.S. PATENT DOCUMENTS

| | | | |
|---|---|---|---|
| 2006/0262343 A1 | 11/2006 | Kikuchi et al. | |
| 2007/0103724 A1* | 5/2007 | Jeyachandran et al. | 358/1.15 |
| 2008/0007791 A1* | 1/2008 | Nagarajan et al. | 358/402 |
| 2008/0043282 A1* | 2/2008 | Tsuboi | 358/1.15 |
| 2008/0134309 A1* | 6/2008 | Qin | G06F 21/105 726/6 |
| 2008/0250479 A1* | 10/2008 | Matoba | 726/5 |
| 2009/0002753 A1* | 1/2009 | Mitsuoka et al. | 358/1.15 |
| 2009/0021780 A1* | 1/2009 | Sato et al. | 358/1.15 |
| 2009/0059291 A1* | 3/2009 | Nagano | 358/1.15 |
| 2009/0135446 A1* | 5/2009 | Kawabuchi et al. | 358/1.15 |
| 2009/0163180 A1* | 6/2009 | Badiger | H04M 1/663 455/412.2 |
| 2009/0207448 A1* | 8/2009 | Takagi | 358/1.15 |
| 2010/0017334 A1* | 1/2010 | Itoi | G06Q 20/02 705/71 |
| 2010/0290081 A1* | 11/2010 | Uchida | 358/1.15 |
| 2011/0026075 A1* | 2/2011 | Maruyama et al. | 358/1.15 |
| 2011/0219427 A1* | 9/2011 | Hito | G06F 21/00 726/3 |
| 2011/0235097 A1* | 9/2011 | Iwasawa | 358/1.15 |
| 2013/0217337 A1* | 8/2013 | Fukui | H04B 5/02 455/41.2 |
| 2015/0142742 A1* | 5/2015 | Hong | G06F 17/30097 707/634 |

FOREIGN PATENT DOCUMENTS

| | | |
|---|---|---|
| JP | 11-234458 A | 8/1999 |
| JP | 11341208 A | 12/1999 |
| JP | 2003338896 A | 11/2003 |
| JP | 2005027139 A | 1/2005 |
| JP | 2005073186 A | 3/2005 |
| JP | 2006324968 A | 11/2006 |
| JP | 2007088848 A | 4/2007 |
| JP | 2007104375 A | 4/2007 |
| JP | 2007208957 A | 8/2007 |

* cited by examiner

| IDENTIFIER (ID) | PROTOCOL | DESTINATION NAME | DESTINATION ADDRESS/ DESTINATION FAX NUMBER |
|---|---|---|---|
| 10000001 | FAX | ○○REAL ESTATE | 1111-11-1111 |
| 30000002 | FAX | △△TRADING COMPANY | 1111-11-1112 |
| 50000003 | E-MAIL | □□MANAGER | abc@abcdef.com |
| ... | ... | ... | ... |

| IDENTIFIER (ID) | DESTINATION ADDRESS/ DESTINATION FAX NUMBER |
|---|---|
| 10000001 | 1111-11-1111 |
| 30000002 | 1111-11-1112 |
| 50000003 | abc@abcdef.com |
| ... | ... |

```
THIS DESTINATION IS GOING
TO BE USED FOR THE FIRST TIME.
IS THE FOLLOWING DESTINATION CORRECT?

DESTINATION NAME:  Masao Maruyama
    DESTINATION ADDRESS: maru@mail.com

```
THE DESTINATION HAS BEEN CHANGED TO THE
FOLLOWING DESTINATION SINCE THE LAST USE.
IS THE FOLLOWING DESTINATION CORRECT?

DESTINATION NAME:  Manager Abe
    DESTINATION ADDRESS: abc@abcdef.com

IMAGE PROCESSING APPARATUS THAT PREVENTS ERRONEOUS TRANSMISSION, METHOD OF CONTROLLING THE SAME, AND STORAGE MEDIUM

BACKGROUND OF THE INVENTION

1. Field of the Invention

The present invention relates to an image processing apparatus, a method of controlling the same, and a storage medium, and more particularly to a technique for preventing erroneous transmission.

2. Description of the Related Art

Conventionally, there has been proposed a facsimile machine having a destination confirmation function for causing a user to confirm whether or not a destination is correct by displaying destination information designated before transmission in order to prevent erroneous facsimile transmission (see Japanese Patent Laid-Open Publication No. H11-234458). In general, in facsimile transmission or E-mail transmission, a user selects a destination while confirming destination information using an address book or the like. The destination confirmation function equipped in the facsimile machine is used for preventing erroneous transmission by displaying detailed destination information again after the user has selected a destination to thereby prompt the user to confirm the selected destination.

On the other hand, in recent years, there has appeared a technique of sharing an address book on a network. For example, an apparatus (address book client) which uses a shared address book accesses an apparatus (address book server) that holds and manages the address book to thereby share the address book. Thus, when a user uses a transmission function or a transfer function of the address book client, the user can use destination data in an external shared address book. Note that the transfer function is a function that automatically transfers received image data to a set destination according to set conditions.

However, an administrator of the address book server sometimes changes destination information in the shared address book, which has already been in use by the address book client. In such a case, for example, if a user performs facsimile transmission using the changed destination information as it is, without knowing that the destination information on the shared address book has been changed, this can cause erroneous transmission. As described above, when the shared address book is used for various functions of a plurality of address book clients, a change in destination information in the shared address book can cause an increase in the frequency of erroneous transmission.

Although the destination confirmation function disclosed in Japanese Patent Laid-Open Publication No. H11-234458 makes it possible to confirm destination information before transmission, this requires a user to confirm destination information each time even when there is no change in the destination information, which is annoying to the user. Particularly, in these days, URLs (uniform resource locator) and E-mail addresses tend to become long, so that it is an extra burden for the user to confirm the destination each time. As a result, the user is apt to carelessly confirm the destination from habit and can overlook a change in the destination. Therefore, it is preferable to prompt the user to confirm destination not at each time of transmission but at a time a client uses destination information in the shared address book for the first time and a time the client uses the destination information after it has been changed, for the first time.

In general, each piece of destination information is formed by a destination name and a destination address (including a destination facsimile number). When a user uses the destination information for the first time, the user carefully confirms whether or not the destination name and the destination address are correct. Then, if the destination address has not been changed when the user uses the destination information next time, it is not necessary to carefully confirm the destination information. Thereafter, if the destination address has been changed, it becomes necessary to carefully confirm again whether or not the destination address is correct.

Further, in Japanese Patent Laid-Open Publication No. H11-234458, in the case of a function that automatically operates in a state in which a user is not in front of the apparatus, such as the transfer function, the user cannot confirm the destination. Therefore, it is necessary to provide a confirmation method adapted to a function which uses a destination to the user.

SUMMARY OF THE INVENTION

The present invention provides an image processing apparatus capable of preventing erroneous transmission due to a change in destination information in a shared address book, a method of controlling the image processing apparatus, and a storage medium.

In a first aspect of the present invention, there is provided an image processing apparatus including a communication unit that transmits and receives image data, comprising an acquisition unit configured to acquire destination information including at least an identifier and a destination, a designation unit configured to selectively designate destination information on a transmission destination of the image data from the destination information acquired by the acquisition unit, a storage unit configured to store the destination information on a transmission destination of image data transmitted by the communication unit, which is designated by the designation unit, a determining unit configured to determine whether or not the acquired destination information has been changed by comparing the destination information designated by the designation unit and the destination information stored in the storage unit, and a display unit configured to display a confirmation screen for the designated destination information when it is determined by the determining unit that the acquired destination information has been changed, wherein the designation unit designates destination information on a transmission destination of the image data from the acquired destination information according to a user's confirming operation on the confirmation screen displayed on the display unit.

In a second aspect of the present invention, there is provided an image processing apparatus including a communication unit that transfers received image data to a transfer destination set in advance, comprising an acquisition unit configured to acquire destination information including at least an identifier, a setting unit configured to set transfer destination information on the received image data from the destination information acquired by the acquisition unit, a storage unit configured to store transfer destination information on image data transferred by the communication unit, which is set by the setting unit, a determining unit configured to determine whether or not the acquired destination information has been changed by comparing the transfer destination information set by the setting unit and the transfer destination information stored in the storage unit, and a display unit configured to display a confirmation screen for the transfer destination information when it is determined by the determining unit that the acquired destination information has been changed, wherein the setting unit sets the transfer destination information from the acquired destination information according to a user's confirming operation on the confirmation screen displayed on the display unit.

In a third aspect of the present invention, there is provided a method of controlling an image processing apparatus including a communication unit that transmits and receives image data, comprising acquiring destination information including at least an identifier and a destination, selectively designating destination information on a transmission destination of the image data from the acquired destination information, storing the destination information on a transmission destination of image data transmitted by the communication unit, which is designated by the selective designating, in a storage unit, determining whether or not the acquired destination information has been changed by comparing the destination information designated by the selective designating and the destination information stored in the storage unit, and displaying a confirmation screen for the designated destination information on a display unit when it is determined that the acquired destination information has been changed, wherein the selective designating includes designating destination information on a transmission destination of the image data from the acquired destination information according to a user's confirming operation on the confirmation screen displayed on the display unit.

In a fourth aspect of the present invention, there is provided a method of controlling an image processing apparatus including a communication unit that transfers received image data to a transfer destination set in advance, comprising acquiring destination information including at least an identifier, setting transfer destination information on the received image data from the acquired destination information, storing transfer destination information on image data transferred by the communication unit, which is set by the setting, determining whether or not the acquired destination information has been changed by comparing the transfer destination information set by the setting and the transfer destination information stored in the storage unit, and displaying a confirmation screen for the transfer destination information on a display unit when it is determined that the acquired destination information has been changed, wherein the setting includes setting the transfer destination information from the acquired destination information according to a user's confirming operation on the confirmation screen displayed on the display unit.

In a fifth aspect of the present invention, there is provided a non-transitory computer-readable storage medium storing a computer-executable program for causing a computer to execute a method of controlling an image processing apparatus including a communication unit that transmits and receives image data, wherein the method comprises acquiring destination information including at least an identifier and a destination, selectively designating destination information on a transmission destination of the image data from the acquired destination information, storing the destination information on a transmission destination of image data transmitted by the communication unit, which is designated by the selective designating, in a storage unit, determining whether or not the acquired destination information has been changed by comparing the destination information designated by the selective designating and the destination information stored in the storage unit, and displaying a confirmation screen for the designated destination information on a display unit when it is determined that the acquired destination information has been changed, wherein the selective designating includes designating destination information on a transmission destination of the image data from the acquired destination information according to a user's confirming operation on the confirmation screen displayed on the display unit.

In a sixth aspect of the present invention, there is provided a non-transitory computer-readable storage medium storing a computer-executable program for causing a computer to execute a method of controlling an image processing apparatus an image processing apparatus including a communication unit that transfers received image data to a transfer destination set in advance, wherein the method comprises acquiring destination information including at least an identifier, setting transfer destination information on the received image data from the acquired destination information, storing transfer destination information on image data transferred by the communication unit, which is set by the setting, determining whether or not the acquired destination information has been changed by comparing the transfer destination information set by the setting and the transfer destination information stored in the storage unit, and displaying a confirmation screen for the transfer destination information on a display unit when it is determined that the acquired destination information has been changed, wherein the setting includes setting the transfer destination information from the acquired destination information according to a user's confirming operation on the confirmation screen displayed on the display unit.

According to the present invention, when destination information in a shared address book is used for the first time and when the destination information has been changed, a user is prompted to confirm the destination before data transmission, and hence the user can confirm the destination in proper timing. This makes it possible to reduce omission or an error of destination confirmation to thereby prevent erroneous transmission.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
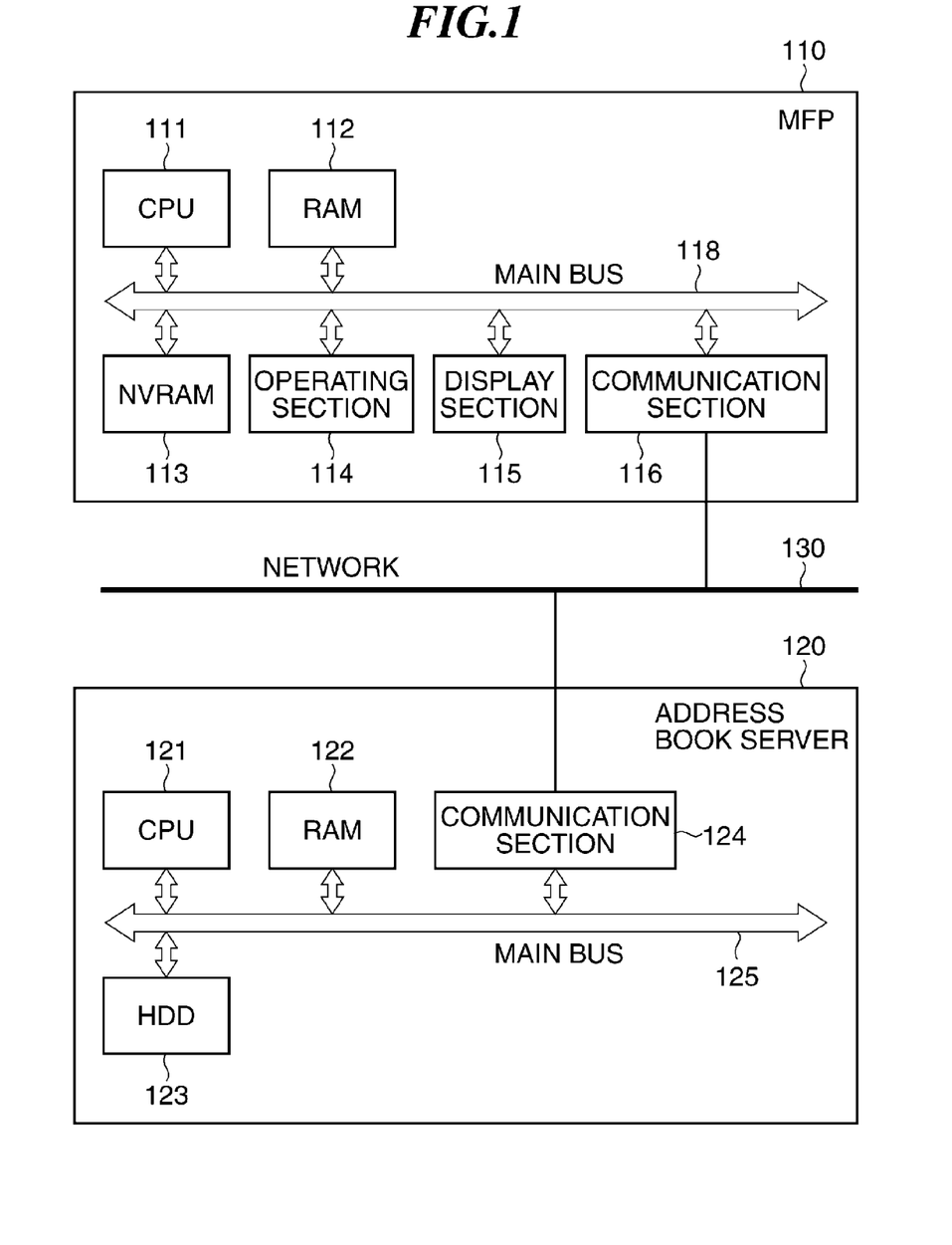
FIG. 1 is a schematic diagram of the arrangement of an MFP (multifunction printer) as an image processing apparatus according to an embodiment of the present invention and an address book server.

FIG. 1 is a schematic diagram of the arrangement of an MFP (multifunction printer) as an image processing apparatus according to an embodiment of the present invention and an address book server. FIG. 1 shows only components relevant to the present invention, so that other components are omitted.

In FIG. 1, the MFP, denoted by reference numeral 110, as the image processing apparatus has a network communication function, a facsimile transmission and reception function, and so forth, and is capable of accessing an address book server 120 via a network 130. The address book server 120 is an information processing apparatus that holds and manages an address book shared by various kinds of apparatuses on the network 130. The MFP 110 functions as the above-mentioned address book client that can use the address book held in the address book server 120.

The MFP 110 includes a CPU (central processing unit) 111 that controls the components of the MFP 110, and a RAM (random access memory) 112, a NVRAM (non-volatile RAM) 113, an operating section 114, a display section 115, and a communication section 116, which are connected to and are controlled by the CPU 111 via a main bus 118. The RAM 112 is a memory which functions as a work area for the CPU 111. The NVRAM 113 is a non-volatile memory for storing programs and various items of setting information. The NVRAM 113 stores a destination usage history table which includes E-mail addresses, FAX numbers, etc. The NVRAM 113 may be replaced by a hard disk (HDD) or the like.

The operating section 114 is used for inputting instructions by a user (including a user and an installation personnel). The display section 115 is implemented by a touch panel, a liquid crystal display unit, or the like, and displays various screens. The communication section 116 performs facsimile transmission and reception, E-mail transmission and reception, data transfer, and so forth to and from other apparatuses via the network 130. The main bus 118 is an internal bus that connects between the above-mentioned components.

The address book server 120 includes a CPU 121 that controls components of the address book server 120, and a RAM 122, a hard disk drive (HDD) 123, and a communication section 124, which are connected to and controlled by the CPU 121 via a main bus 125. The RAM 122 is a memory that functions as a work area for the CPU 121. The HDD 123 is a storage device for storing programs and various items of setting information. The HDD 123 stores an address book including such information as E-mail addresses and FAX numbers. The HDD 123 may be replaced by a NVRAM or the like. The communication section 124 performs communication with other apparatuses via the network 130. The main bus 125 is an internal bus that connects between the above-mentioned components.

Although in the present embodiment, a description will be given of the arrangement in which the MFP 110 and the address book server 120 are connected via the network 130, the MFP 110 and the address book server 120 may be combined in one unit. In this case, the address book stored in the HDD 123 may be stored in the HDD 123, the NVRAM 113 or the like.

Figure 2A:
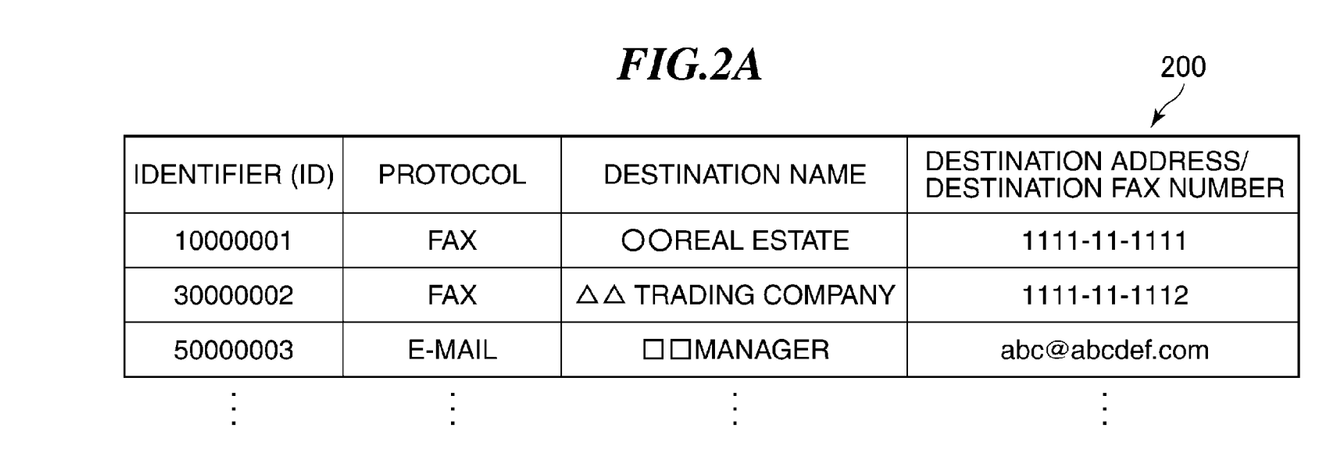
FIG. 2A is a diagram of an example of an address book stored and managed in an HDD of the address book server.
Figure 2B:
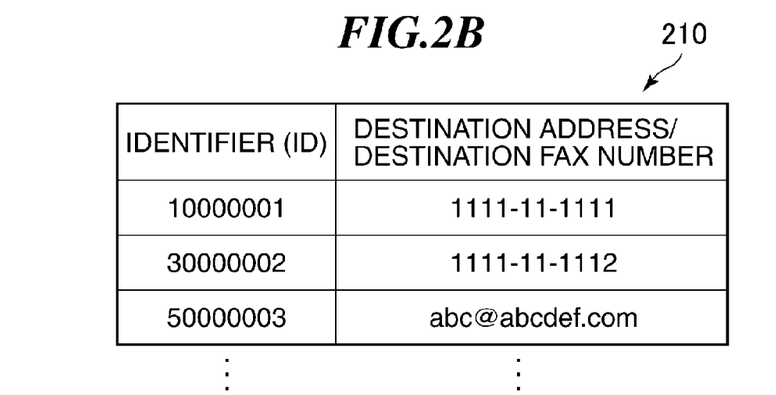
FIG. 2B is a diagram of an example of a destination usage history table stored in a NVRAM (non-volatile RAM) within the MFP.

FIG. 2A is a diagram of an example of an address book stored and managed in the HDD 123 of the address book server 120. FIG. 2B is a diagram of an example of the destination usage history table stored in the NVRAM 113 of the MFP 110.

Referring to FIG. 2A, the address book, denoted by reference numeral 200, is formed by a plurality of items of destination data. Each item of destination data includes such information as an identifier (ID) for identifying the destination data, a protocol, a destination name, and a destination address/destination FAX number. The identifier (ID) may be a universal unique identifier, or may be a combination of an identifier (e.g. IP address) for identifying the address book server 120 and an identifier which is unique within the address book server 120. The destination address/destination FAX number includes an E-mail address and a FAX number of a destination.

The address book server 120 can make the address book 200 stored in the HDD 123 open to access from other apparatuses on the network, including the MFP 110, by the communication section 124.

Referring to FIG. 2B, the destination usage history table, denoted by reference numeral 210, stores E-mail addresses and FAX numbers of destinations, which are used in E-mail transmission and FAX transmission executed by the MFP 110, together with the above-mentioned identifiers.

Figure 3:
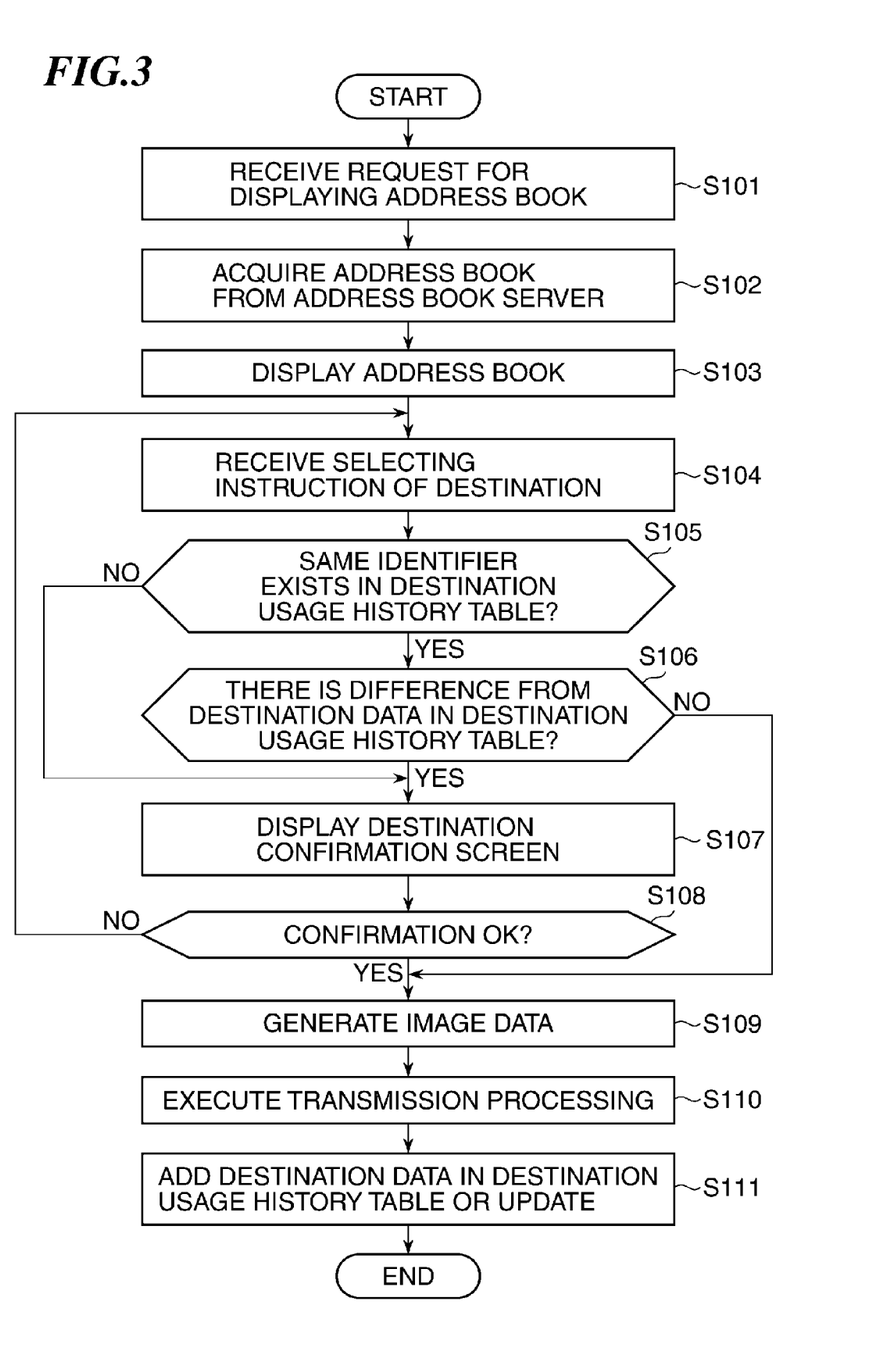
FIG. 3 is a flowchart of a transmission process executed by the MFP.

FIG. 3 is a flowchart of a transmission process executed by the MFP 110 in the present embodiment.

First, the CPU 111 receives a request for displaying the address book 200 from the operating section 114 (step S101). Next, the CPU 111 sends a request to the address book server 120 on the network 130 via the communication section 116 so as to acquire the address book 200 therefrom, and receives (acquires) the address book 200 from the address book server 120 (step S102). In a case where the MFP 110 and the address book server 120 are integrally configured, the CPU 111 acquires the address book 200 stored in the NVRAM 113 via the main bus 118. Data of the acquired address book is list information comprising identifiers, protocols, destination names, and destination addresses/destination FAX numbers of respective items of destination data, shown in FIG. 2A.

Next, the CPU 111 displays the acquired address book 200 on the display section 115 (step S103). Although displayed on the display section 115 are identifiers, protocols, destination names, and destination addresses/destination FAX numbers, only destination names and destination addresses/destination FAX numbers may be displayed. After displaying the address book 200, the CPU 111 receives a selecting instruction of a destination of E-mail transmission or FAX transmission, from the operating section 114 (step S104). In this case, the operating section 114 functions as a designation unit for selectively designating a destination.

Next, the CPU 111 determines whether or not destination data having the same identifier as that of the destination designated by the selecting instruction in the step S104 exists in the destination usage history table 210 (step S105). At this time, the CPU 111 functions as a first determining unit.

Figure 4A:
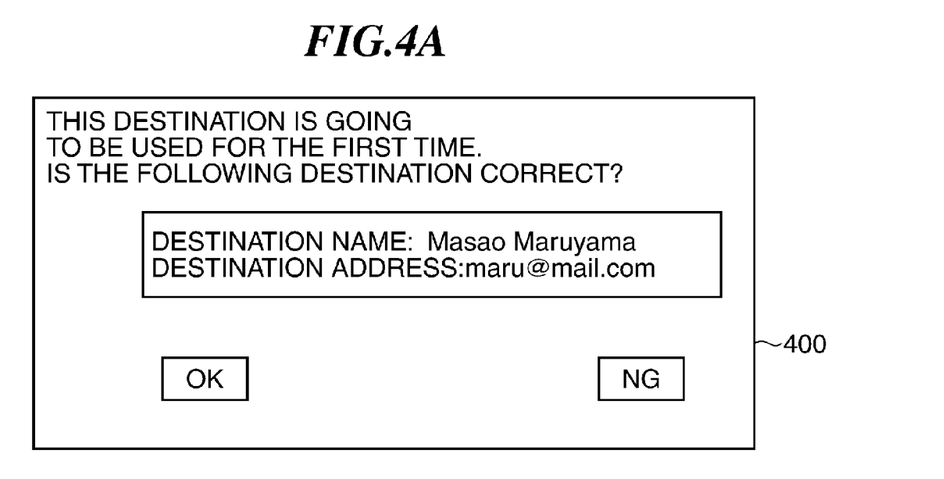
FIG. 4A is a view of an example of a destination confirmation screen.

If it is determined in the step S105 that the corresponding destination data exists, the CPU 111 proceeds to a step S106. On the other hand, if it is determined that the corresponding destination data does not exist, the CPU 111 displays a destination confirmation screen 400 as shown in FIG. 4A (step S107). At this time, the display section 115 functions as a display unit.

After displaying the destination confirmation screen 400, the CPU 111 receives a selecting instruction of confirmation OK or confirmation NG from the operating section 114 to perform OK/NG determination (step S108). If it is determined in the step S108 that the confirmation is NG, the CPU 111 returns to the step S104. On the other hand, if it is determined in the step S108 that the confirmation is OK, the CPU 111 generates image data for transmission from an image read from an original by an image reading section, not shown, or an image stored in the NVRAM 113 (step S109). Then, the CPU 111 transmits the generated image data to the destination designated in the step S104 via the communication section 116 (step S110). In the data transmission, a protocol for E-mail or a protocol for FAX is used.

Next, the CPU 111 newly adds the used destination data to the destination usage history table 210 (step S111), followed by terminating the present process. In the step S111, the CPU 111 functions as an addition unit.

On the other hand, in the step S106, the CPU 111 compares the destination data stored in the destination usage history table 210 and the destination data designated by the selecting instruction, and determines whether or not there is a difference between them (step S106). In the step S106, the CPU 111 functions as a second determining unit for determining whether or not the destination information has been changed.

Figure 4B:
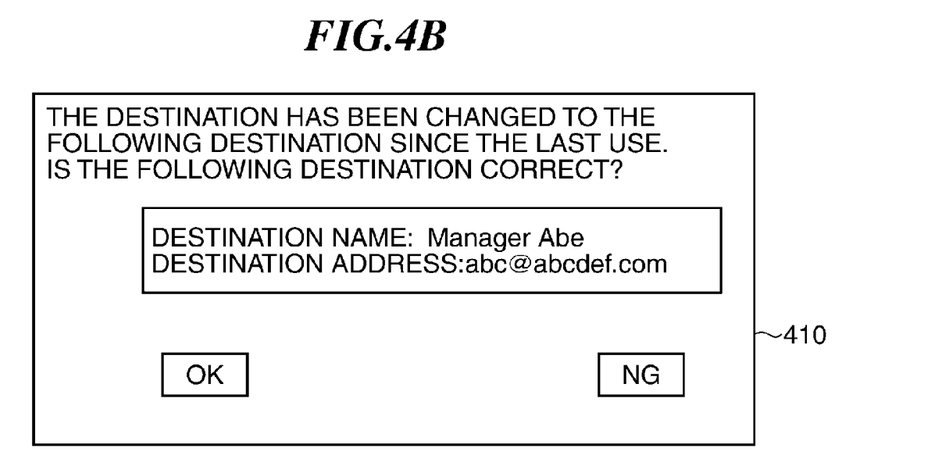
FIG. 4B is a view of another example of the destination confirmation screen.

If it is determined in the step S106 that there is a difference, the CPU 111 judges that the destination information acquired from the address book server 120 has been changed, and displays a destination confirmation screen 410, as shown in FIG. 4B, on the display section 115 (step S107). In the step S107, the display section 115 functions as the display unit.

After displaying the destination confirmation screen 410, the CPU 111 receives the selecting instruction of confirmation OK or confirmation NG from the operating section 114 to perform OK/NG determination (step S108). As described above, the designation of the destination is ensured by the user's operation for confirmation. If it is determined in the step S108 that the confirmation is NG, the CPU 111 returns to the step S104. On the other hand, if it is determined that the confirmation is OK, the CPU 111 generates image data (step S109), and performs data transmission processing (step S110). After the data transmission processing, the CPU 111 updates the destination name and the destination address/destination FAX number of the destination data in the destination usage history table 210, which has the same identifier as that of the used destination data (step S111), followed by terminating the present process.

If it is determined in the step S106 that there is no difference, the CPU 111 generates immediately image data without displaying the illustrated destination confirmation screen (step S109), and performs the transmission processing (step S110). In this case, in the step S111, the destination usage history table 210 may be updated with the used destination data, or no processing may be performed.

As described above, in the present embodiment, in the first use of destination data stored in the address book server 120, the user is prompted to confirm the destination. After that, when using the same destination data, if the destination data stored in the address book server has been changed since the last use of the destination data, the user is prompted to confirm the destination. On the other hand, if the destination data has not been changed, the user is not required to confirm the destination. Thus, the user is prompted to confirm the destination before data transmission when the destination information in the shared address book is first used and when the destination information has been changed, and hence the user can perform destination confirmation in suitable timing. As a result, it is possible to reduce omission or errors of destination confirmation to thereby prevent erroneous transmission.

Figure 5:
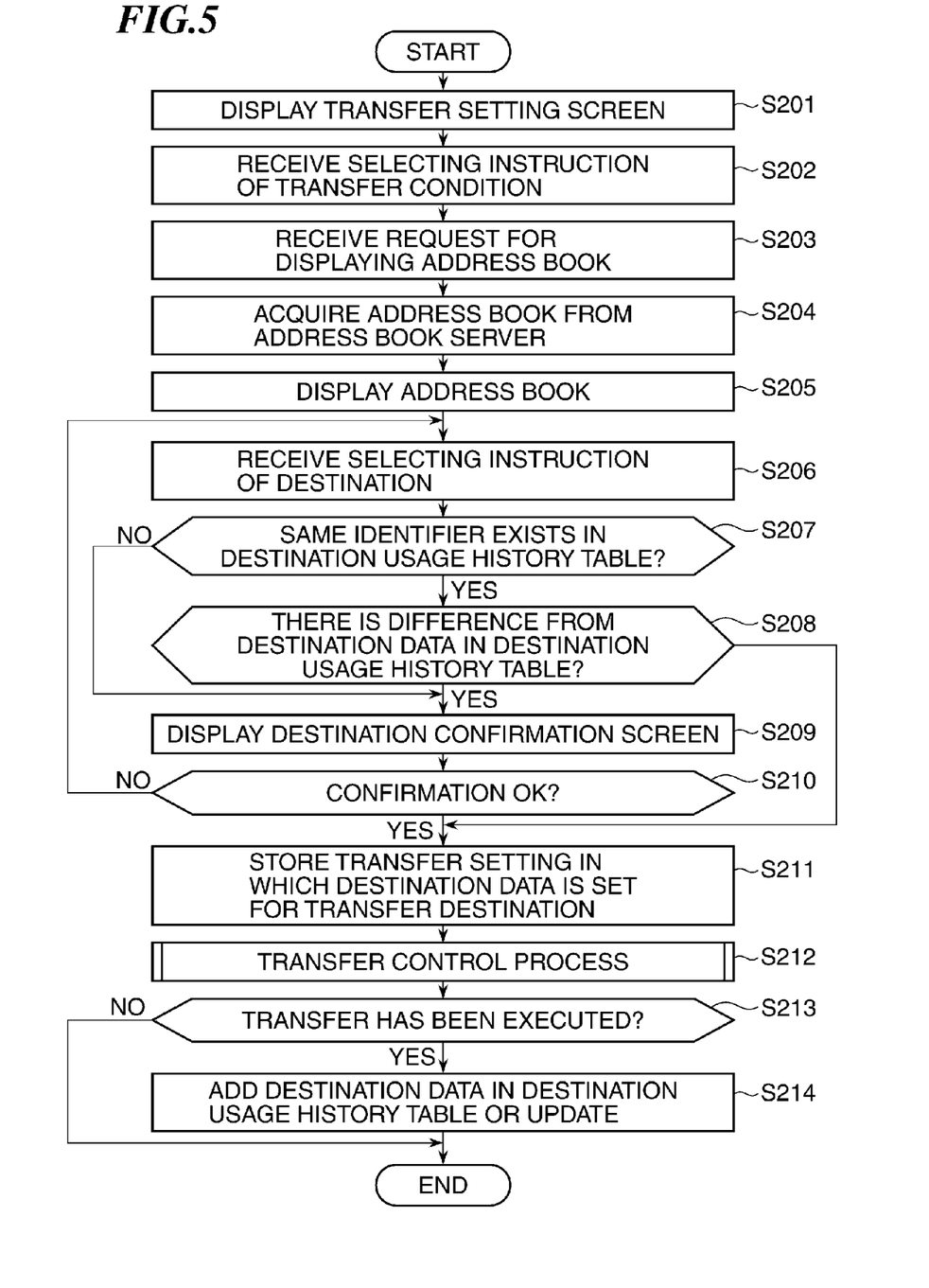
FIG. 5 is a flowchart of a transfer process executed by the MFP.

FIG. 5 is a flowchart of a transfer process executed by the MFP 110 as the image processing apparatus according to the present embodiment.

First, the CPU 111 displays a screen (not shown) on the display section 115, for prompting the user to make an input for configuring the transfer settings (step S201). Next, the CPU 111 receives a selecting instruction of a transfer condition from the operating section 114 (step S202). The transfer condition is a condition depending on which data is transferred when the data is received, and the transfer condition is defined, for example, such that "if received via FAX, execute transfer".

Next, the CPU 111 receives a request from the operating section 114, which requests to display the address book 200 (step S203). Then, the CPU 111 sends a request which requests to send the address book 200, to the address book server 120 on the network 130 via the communication section 116, so as to acquire the address book 200, and receives (acquires) the address book 200 from the address book server 120 (step S204). In the case where the MFP 110 and the address book server 120 are integrally configured, the CPU 111 acquires the address book 200 stored in the NVRAM 113 via the main bus 118.

Next, the CPU 111 displays the acquired address book 200 on the display section 115 (step S205). Although displayed on the display section 115 are identifiers, protocols, destination names, and destination addresses/destination FAX numbers, only destination names and destination addresses/destination FAX numbers may be displayed. After displaying the address book 200, the CPU 111 receives a selecting instruction of a transfer destination of E-mail transmission or FAX transmission from the operating section 114 (step S206). In this case, the operating section 114 functions as a setting unit for setting transfer destination information.

Next, the CPU 111 determines whether or not destination data having the same identifier as that of the destination (transfer destination) designated by the selecting instruction in the step S206 exists in the destination usage history table 210 (step S207). At this time, the CPU 111 functions as the first determining unit.

If it is determined in the step S207 that the corresponding destination data exists, the CPU 111 proceeds to a step S208. On the other hand, if it is determined that the corresponding destination data does not exist, the CPU 111 displays the destination confirmation screen 400 as shown in FIG. 4A on the display screen 115 (step S209). At this time, the display section 115 functions as the display unit.

Figure 6:
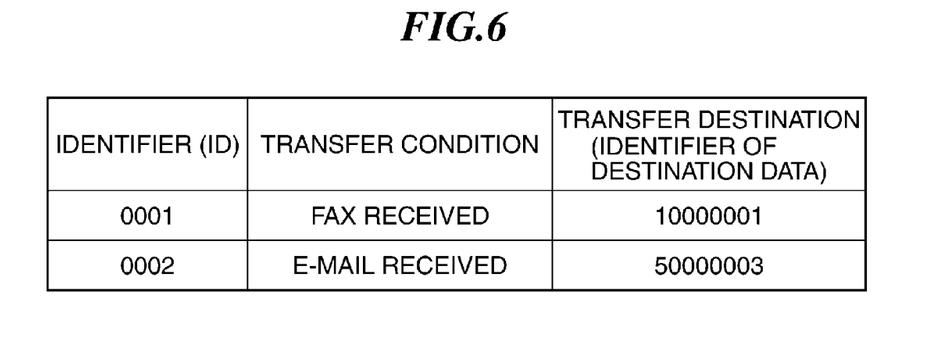
FIG. 6 is a diagram of an example of transfer setting stored in the NVRAM.

After displaying the destination confirmation screen 400, the CPU 111 receives a selecting instruction of confirmation OK or confirmation NG from the operating section 114 to perform OK/NG determination (step S210). If it is determined in the step S210 that the confirmation is NG, the CPU 111 returns to the step S206. On the other hand, if it is determined in the step S210 that the confirmation is OK, the CPU 111 stores the transfer setting (transfer destination information) which is received in the step S202 and set for the destination designated by the selecting instruction is the step S306, in the NVRAM 113 (step S211). FIG. 6 shows an example of the transfer setting (transfer destination information) stored in the NVRAM 113. As the transfer destination, the identifier of the destination data shown in FIG. 2A is set.

Next, the CPU 111 executes a transfer control process for controlling transfer of the received image data (step S212), and determines whether or not the data transfer has been executed (step S213). If the data transfer has not been executed (NO to the step S213), the CPU 111 terminates the present process, whereas if the data transfer has been executed (YES to the step S213), the CPU 111 newly adds the used destination data to the destination usage history table 210 (step S214), followed by terminating the present process. In the step S214, the CPU 111 functions as the addition unit.

On the other hand, in a step S208, the CPU 111 compares the destination data stored in the destination usage history table 210 and the destination data designated by the selecting instruction, and determines whether or not there is a difference between them (step S208). In the step S208, the CPU 111 functions as the second determining unit for determining whether or not the destination information has been changed.

If it is determined in the step S208 that there is a difference, the CPU 111 judges that the destination information acquired from the address book server 120 has been changed, and displays the destination confirmation screen 410, as shown in FIG. 4B, on the display section 115 (step S209). In the step S209, the display section 115 functions as the display unit.

After displaying the destination confirmation screen 410, the CPU 111 receives a selecting instruction of confirmation OK or confirmation NG from the operating section 114 to perform OK/NG determination (step S210). As described above, the setting of the transfer destination is ensured by the user's operation for confirmation. If it is determined in the step S210 that the confirmation is NG, the CPU 111 returns to the step S206. On the other hand, if it is determined that the confirmation is OK, the CPU 111 stores the transfer setting (transfer destination information) which is received in the step S202 and set for the destination designated by the selecting instruction is the step S306, in the NVRAM 113 (step S211).

Next, the CPU 111 executes the transfer process for transferring the received image data (step S212), and updates the destination name and the destination address/destination FAX number of the destination data having the same identifier as that of the used destination data in the destination usage history table 210 (step S213), followed by terminating the present process.

Figure 7:
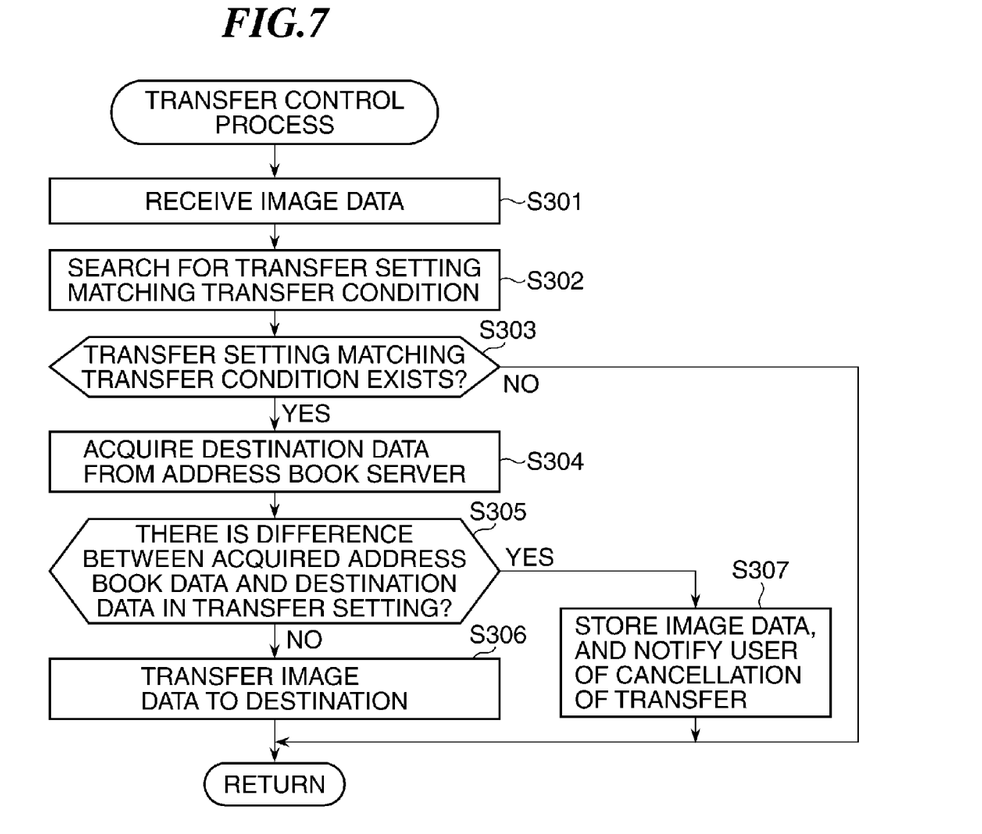
FIG. 7 is a flowchart of a transfer control process executed as a subroutine in a step of the transfer process in FIG. 5.

FIG. 7 is a flowchart of the transfer control process executed as a subroutine in the step S212 of the transfer process in FIG. 5.

First, the CPU 111 receives image data via the communication section 116 (step S301). In the data reception, a protocol for E-mail or a protocol for FAX is used.

Next, the CPU 111 reads a list of the transfer setting as shown in FIG. 6 from the NVRAM 113 to search for a transfer setting matching the transfer condition (step S302). Then, the CPU 111 determines whether or not there is a transfer setting matching the transfer condition in the transfer setting list (step S303). If it is determined in the step S303 that there is no transfer setting matching the transfer condition, the CPU 111 returns. On the other hand, if it is determined in the step S303 that there is a transfer setting matching the transfer condition, the CPU 111 acquires destination data corresponding to the identifier of the transfer destination in the transfer setting from the address book server 120 (step S304).

Next, the CPU 111 compares the destination data set in the transfer setting and the destination data acquired from the address book server 120, and determines whether or not there is a difference between them (step S305). If it is determined that there is a difference, the CPU 111 stores the image data in the NVRAM 113, and notifies the user of cancellation of the transfer operation (step S307). To notify the user of cancellation in the step S307, there may be employed a method that the CPU 111 displays a message to the effect that the transfer operation has been canceled on the display section 115, by way of example. Further, there may be employed another method that the CPU 111 sends an E-mail or a FAX to an administrator of the MFP 110 via the communication section 116 to thereby notify the user of cancellation of the transfer operation. A still another example of the notification method is that the CPU 111 sends an E-mail or a FAX to a sender of the image data received in the step S301 via the communication section 116 to thereby notify the sender of cancellation of the transfer operation. Since the image data has been stored in the NVRAM 113, the user having received the notification of cancellation can restart the transfer operation of the image data after checking the destination.

On the other hand, if it is determined in the step S305 that there is no difference, the CPU 111 transfers the image data to the destination of the destination data via the communication section 116 (step S306). In the data transfer, a protocol for E-mail or a protocol for FAX is used.

As described above, in the present embodiment, in registering a destination stored in the address book server, in the transfer setting, if the destination is used for the first time, the user is prompted to confirm the destination. Further, when the same destination data is used again for the transfer setting, if the destination data has been changed since it was used last time, the user is prompted to confirm the destination again. This contributes to prevention of an erroneous setting when the destination data is used for the transfer setting.

Further, in data transfer, it is confirmed whether or not the destination data stored in the address book server has been changed since the transfer setting was registered. Then, if the destination data has been changed, the transfer setting is canceled after the image data has been stored, and the user is notified of cancellation of the transfer setting. This makes it possible to restart the transfer operation after confirming whether or not the change made in the address book server is appropriate, whereby it is possible to prevent erroneous transmission of E-mails or FAX in automatic transfer.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-278300, filed Dec. 14, 2010, which is hereby incorporated by reference herein in its entirety.

What is claimed is:

1. An image processing apparatus, comprising:
an acquisition unit configured to acquire destination information;
a first designation unit configured to designate first destination information as a transmission destination of image data from the destination information acquired by said acquisition unit, the first destination information including a first identifier and a first destination;
a transmitting unit configured to transmit the image data to the first destination included in the first destination information designated by said first designation unit;
a storage unit configured to store history information including the first destination information designated as a transmission destination of the image data which has been transmitted by the transmitting unit;
a second designating unit configured to designate second destination information as a transmission destination of image data from the destination information newly acquired by said acquisition unit, the second destination information including a second identifier and a second destination;

a comparing unit configured to compare the second destination information designated by said second designation unit and the first destination information included in the history information stored in said storage unit, the first identifier included in the first destination information corresponding to the second identifier included in the second destination information; and a display unit configured to display a confirmation screen for the second destination information designated by said second designation unit based on a comparison result by the comparing unit, wherein the transmitting unit transmits the image data to the second destination included in the second destination information designated by the second designation unit after the display unit displays the confirmation screen and a user's confirming operation is received.

2. The image processing apparatus according to claim 1, further comprising an addition unit configured to add the second destination information into the history information stored in said storage unit, after the transmitting unit transmits the image data to the second destination.

3. An image processing apparatus, comprising:

an acquisition unit configured to acquire destination information;

a first setting unit configured to set first transfer destination information as a transfer destination of received image data from the destination information acquired by said acquisition unit, the first transfer destination information including a first identifier and a first transfer destination;

a transferring unit that transfers the received image data to the first transfer destination included in the first transfer destination information set by said first setting unit;

a storage unit configured to store history information including the first transfer destination information set as the transfer destination of the received image data which has been transferred by the transferring unit;

a second setting unit configured to set second transfer destination information as a transfer destination of a received image data from the destination information newly acquired by said acquisition unit, the second transfer destination information including a second identifier and a second transfer destination;

a comparing unit configured to compare the second transfer destination information set by said second setting unit and the first transfer destination information included in the history information stored in said storage unit, the first identifier included in the first transfer destination information corresponding to the second identifier included in the second transfer destination information; and a display unit configured to display a confirmation screen for the second transfer destination information set by said second setting unit based on a comparison result by the comparing unit, wherein the transferring unit transfers the received image data to the second transfer destination included in the second transfer destination information set by said second setting unit after the display unit displays the confirmation screen and a user's confirming operation is received.

4. The image processing apparatus according to claim 3, wherein after the transferring unit transfers the received image data to the second transfer destination included in the second transfer destination information set by said second setting unit, the set second transfer destination information is added into the history information stored in said storage unit.

5. The image processing apparatus according to claim 3, further comprising a control unit configured to cause said acquisition unit to acquire the first transfer destination information when the image data is received, and cancel transfer of the received image data after storing the received image data if the second transfer destination information is different from the first transfer destination information.

6. The image processing apparatus according to claim 5, wherein said control unit sends a notification to the effect that the transfer of the received image data is canceled, to an administrator of the image processing apparatus.

7. The image processing apparatus according to claim 5, wherein said control unit sends a notification to the effect that the transfer of the received image data is canceled, to a sender of the image data.

8. A method of controlling an image processing apparatus, comprising:

acquiring destination information;

designating first destination information as a transmission destination of image data from the acquired destination information, the first destination information including a first identifier and a first destination;

transmitting the image data to the first destination included in the designated first destination information;

storing, into a storage unit, history information including the first destination information designated as a transmission destination of the image data which has been transmitted;

designating second destination information as a transmission destination of image data from the destination information newly acquired, the second destination information including a second identifier and a second destination;

comparing the designated second destination information the first destination information included in the history information stored in the storage unit, the first identifier included in the first destination information corresponding to the second identifier included in the second destination information; and displaying, on a display unit, a confirmation screen for the second destination information newly designated as the transmission destination of the image data based on a comparison result of the second destination information and the first destination information, wherein the image data is transmitted to the second destination included in the second destination information after the confirmation screen is displayed on the display unit and a user's confirming operation is received.

9. A method of controlling an image processing apparatus, comprising:

acquiring destination information;

setting first transfer destination information as a transfer destination of received image data from the acquired destination information, the first transfer destination information including a first identifier and a first transfer destination;

transferring, based on the set first destination information, the received image data to the first transfer destination included in the set first transfer destination information;

storing history information including the first transfer destination information set as the transfer destination of the received image data which has been transferred;

setting second transfer destination information as a transfer destination of a received image data from the destination information newly acquired, the second transfer destination information including a second identifier and a second transfer destination;

comparing the set second transfer destination information and the first transfer destination information included in the history information stored in the storage unit, the first identifier included in the first transfer destination information corresponding to the second identifier included in the second transfer destination information; and displaying, on a display unit, a confirmation screen for the set second transfer destination information based on a comparison result of the second transfer destination information and the first transfer destination information, wherein the received image data is transferred to the second transfer destination included in the second transfer destination information after the confirmation screen is displayed on said display unit and a user's confirming operation is received.

10. A non-transitory computer-readable storage medium storing a computer-executable program for causing a computer to execute a method of controlling an image processing apparatus, wherein the method comprises:

acquiring destination information;

designating first destination information as a transmission destination of image data from the acquired destination information, the first destination information including a first identifier and a first destination;

transmitting the image data to the first destination included the designated first destination information;

storing, in a storage unit, history information including the first destination information designated as a transmission destination of the image data which has been transmitted;

designating second destination information as a transmission destination of image data from the destination information newly acquired, the second destination information including a second identifier and a second destination;

comparing the designated second destination information and the first destination information included in the history information stored in the storage unit, the first identifier included in the first destination information corresponding to the second identifier included in the second destination information; and displaying, on a display unit, a confirmation screen for the second destination information newly designated as the transmission destination of the image data based on a comparison result of the second destination information and the first destination information, wherein the image data is transmitted to the second destination included in the second destination information after the confirmation screen is displayed on the display unit and a user's confirming operation is received.

11. A non-transitory computer-readable storage medium storing a computer-executable program for causing a computer to execute a method of controlling an image processing apparatus, wherein the method comprises:

acquiring destination information;

setting first transfer destination information as a transfer destination of received image data from the acquired destination information, the first transfer destination information including a first identifier and a first transfer destination;

transferring, based on the set first destination information, the received image data to the transfer destination;

storing history information including the first transfer destination information set as the transfer destination of the received image data which has been transferred;

setting second transfer destination information as a transfer destination of a received image data from the destination information newly acquired, the second transfer destination information including a second identifier and a second transfer destination;

comparing the set second transfer destination information and the first transfer destination information included in the history information stored in the storage unit, the first identifier included in the first transfer destination information corresponding to the second identifier included in the second transfer destination information; and displaying, on a display unit, a confirmation screen for the set second transfer destination information based on a comparison result of the second transfer destination information and the first transfer destination information, wherein the received image data is transferred to the second transfer destination included in the second transfer destination information after the confirmation screen is displayed on said display unit and a user's confirming operation is received.

* * * * *